(12) United States Patent
Vande Sande et al.

(10) Patent No.: US 11,465,657 B2
(45) Date of Patent: Oct. 11, 2022

(54) TWENTY-FOOT DOUBLE STACK WELL CAR

(71) Applicant: Trinity North American Freight Car, Inc., Dallas, TX (US)

(72) Inventors: Jerry W. Vande Sande, Dallas, TX (US); John W. Coulborn, Dallas, TX (US)

(73) Assignee: TRINITY NORTH AMERICAN FREIGHT CAR, INC., Dallas, TX (US)

( * ) Notice: Subject to any disclaimer, the term of this patent is extended or adjusted under 35 U.S.C. 154(b) by 883 days.

(21) Appl. No.: 16/216,334

(22) Filed: Dec. 11, 2018

(65) Prior Publication Data
US 2019/0176857 A1    Jun. 13, 2019

Related U.S. Application Data

(60) Provisional application No. 62/597,591, filed on Dec. 12, 2017.

(51) Int. Cl.
| | |
|---|---|
| *B60P 3/073* | (2006.01) |
| *B61F 5/52* | (2006.01) |
| *B62D 21/00* | (2006.01) |
| *B61F 3/00* | (2006.01) |
| *B61D 3/10* | (2006.01) |
| *B65G 63/00* | (2006.01) |
| *B62D 29/00* | (2006.01) |
| *B60P 3/22* | (2006.01) |
| *B62D 23/00* | (2006.01) |

(52) U.S. Cl.
CPC ............ *B61F 5/52* (2013.01); *B60P 3/073* (2013.01); *B61D 3/10* (2013.01); *B61F 3/00* (2013.01); *B62D 21/00* (2013.01); *B65G 63/00* (2013.01); *B60P 3/2245* (2013.01); *B62D 23/00* (2013.01); *B62D 29/00* (2013.01)

(58) Field of Classification Search
CPC .... B61F 5/52; B61F 3/00; B60P 3/073; B60P 3/2245; B61D 3/10; B62D 21/00; B62D 23/00; B62D 29/00; B65G 63/00
USPC ........................................................ 105/355
See application file for complete search history.

(56) References Cited

U.S. PATENT DOCUMENTS

| | | | |
|---|---|---|---|
| 4,893,567 A * | 1/1990 | Hill ........................ | B61F 1/04 410/52 |
| 6,510,800 B1 * | 1/2003 | Zaerr ...................... | B61D 3/12 105/355 |
| 6,546,878 B1 * | 4/2003 | Smith .................... | B61D 3/187 105/458 |

(Continued)

*Primary Examiner* — Hilary L Gutman
(74) *Attorney, Agent, or Firm* — Baker Botts, LLP

(57) ABSTRACT

According to some embodiments, a railcar comprises a first well component supported by a first railcar truck and a second railcar truck. The first well component is disposed between the first railcar truck and the second railcar truck. The length of the first well component is restricted to transport an intermodal shipping container no longer than twenty feet in length. In particular embodiments, the first well component is configured to transport a double stack of twenty-foot intermodal shipping containers. Each twenty-foot shipping container of the double stack may be loaded to maximum weight of 67,000 pounds. Particular embodiments include an articulated railcar with two or more twenty-foot well components.

20 Claims, 9 Drawing Sheets

(56) References Cited

U.S. PATENT DOCUMENTS

2002/0073889 A1\* 6/2002 Khattab ............... B61D 45/007
  105/404

\* cited by examiner

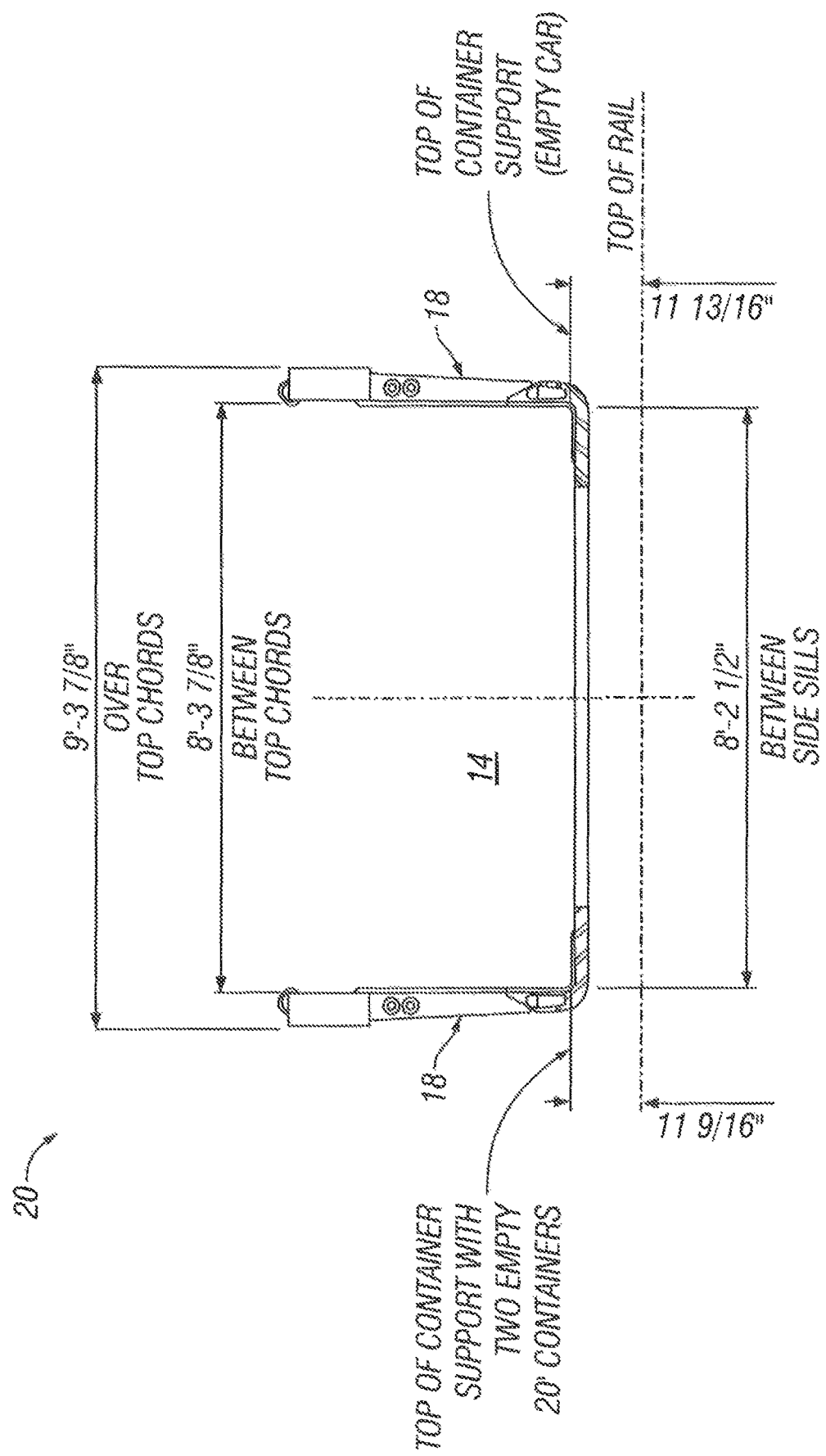

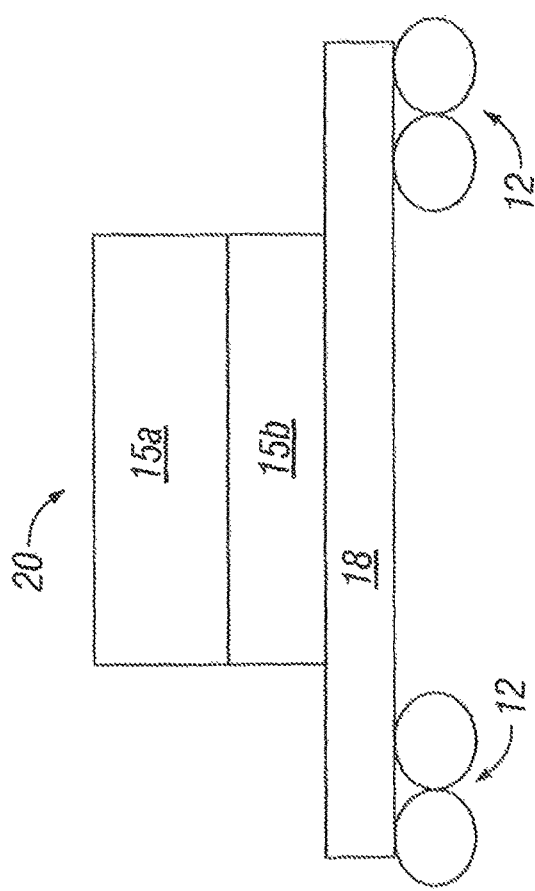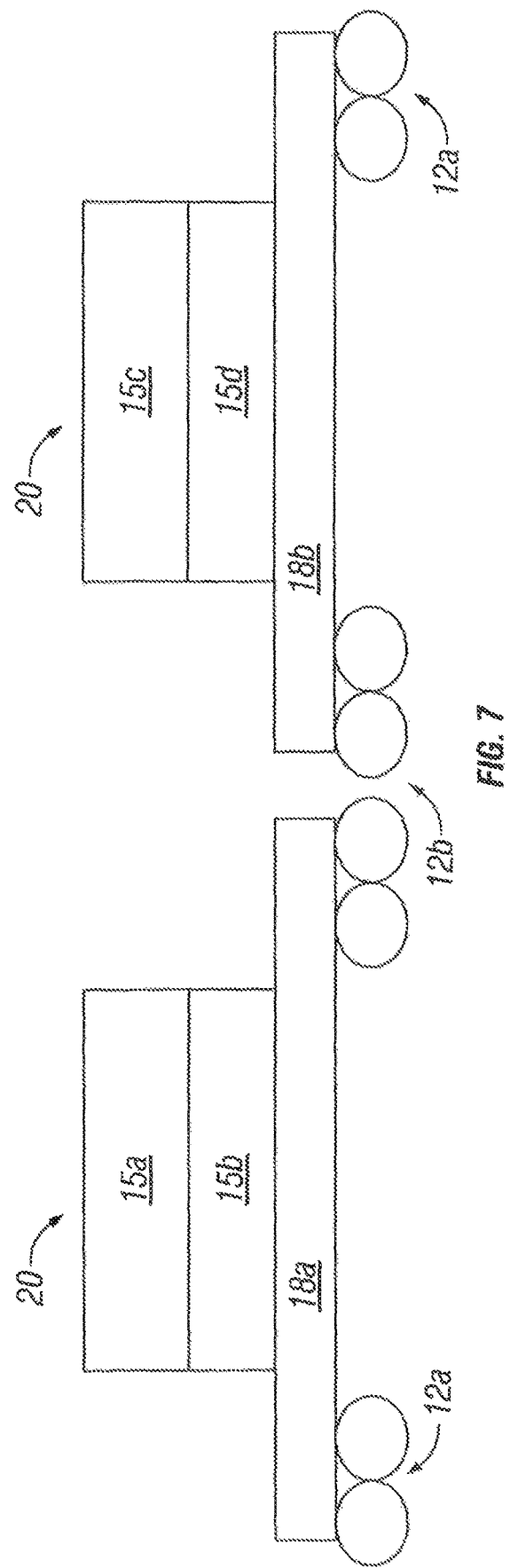

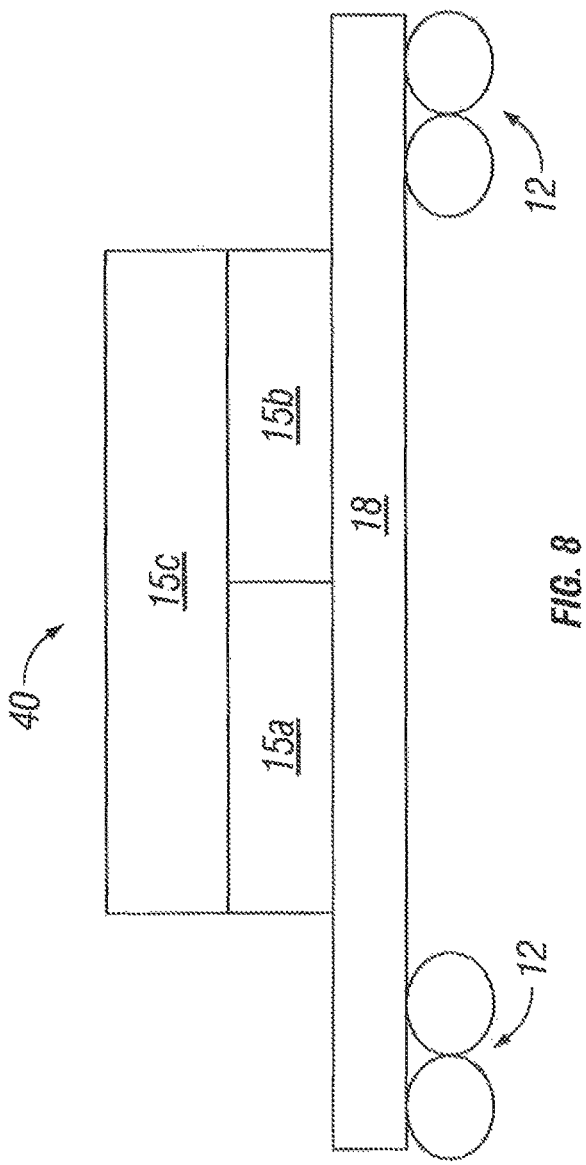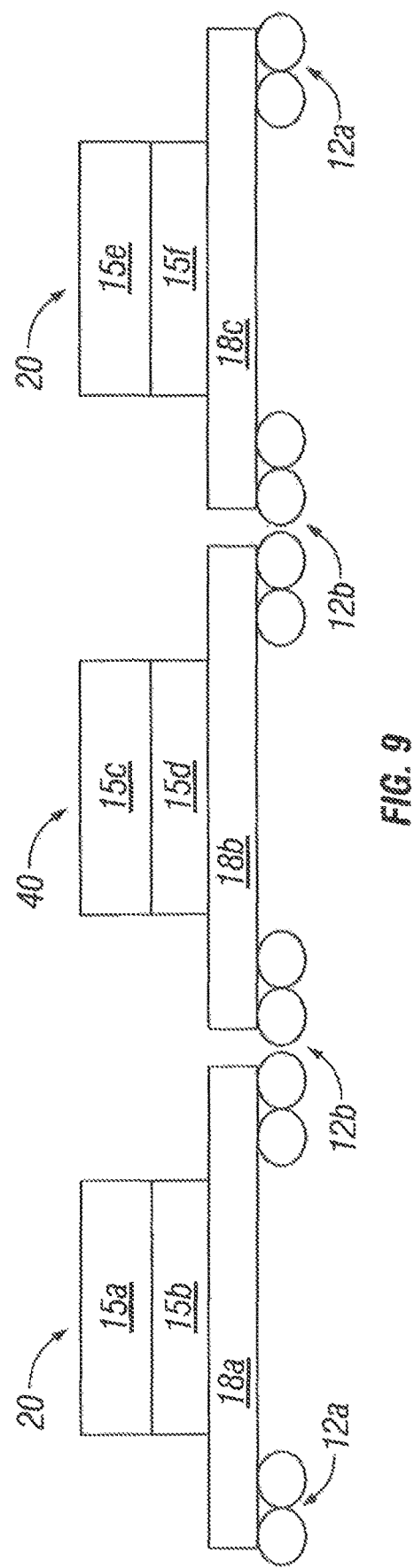

TWENTY-FOOT DOUBLE STACK WELL CAR

RELATED APPLICATIONS

This application claims priority to U.S. Provisional Application Ser. No. 62/597,591 entitled "TWENTY-FOOT DOUBLE STACK WELL CAR," filed Dec. 12, 2017, the entire content of which is incorporated herein by reference.

TECHNICAL FIELD

This disclosure generally relates to railroad cars, and more particularly to a twenty-foot double stack intermodal well car.

BACKGROUND

An intermodal well car is a type of railroad car designed to transport intermodal containers (shipping containers). An intermodal container is a standardized size (length, width, etc.) container for transporting freight using multiple modes of transportation (e.g., rail, ship, truck, etc.). The well of the intermodal well car creates a floor lower than a traditional flatcar. The recessed well facilitates stacking of two intermodal containers (double-stack) without exceeding height limitations for safe passage under bridges, through tunnels, and other structures. A standalone well car includes two trucks, one at each end of the car, supporting the well. Multiple well cars may be joined to together to form an articulated well car where adjacent cars share one truck.

SUMMARY

Conventional articulated well cars (i.e., forty, forty-eight, and fifty-three foot well cars) cannot support four fully loaded ISO containers. As a result, the double stack feature of the wells cannot always be used. The limitation is particularly applicable to twenty-foot containers. According to some embodiments, a twenty-foot well that can be double stacked is more efficient in many cases, such as an articulated well car comprising all twenty-foot wells or a combination of forty-foot and twenty-foot wells. According to some embodiments, an articulated well car comprises at least one twenty-foot well.

According to some embodiments, a railcar comprises a first well component supported by a first railcar truck and a second railcar truck. The first well component is disposed between the first railcar truck and the second railcar truck. The length of the first well component is restricted to transport an intermodal shipping container no longer than twenty feet in length.

In particular embodiments, the length of the first well component is longer than twenty feet and less than forty feet. The length of the first well component may be longer than twenty feet and less than twenty-one feet. The first well component may be configured to transport a double stack of twenty-foot intermodal shipping containers. Each twenty-foot shipping container may be loaded to its maximum weight of 67,000 pounds. The first and second railcar trucks may comprise a 70-ton railcar truck.

In particular embodiments, the second railcar truck is an articulated railcar truck and the railcar further comprises a second well component supported by the second railcar truck and a third railcar truck. The second well component is disposed between the second railcar truck and the third railcar truck. The length of the second well component is restricted to transport an intermodal shipping container no longer than twenty feet in length.

In particular embodiments, the first and third railcar trucks comprises a 70-ton railcar truck and the second railcar truck comprises a 125-ton railcar truck. The first and second well components may be each configured to transport a double stack of twenty-foot intermodal shipping containers. A combined payload capacity of the first well component and the second well component is at least 231,000 pounds.

In particular embodiments, the second railcar truck is an articulated railcar truck and the railcar further comprises a second well component supported by the second railcar truck and a third railcar truck. The second well component is disposed between the second railcar truck and the third railcar truck. The third railcar truck comprises an articulated railcar truck. The railcar further comprises a third well component supported by the third railcar truck and a fourth railcar truck. The third well component is disposed between the third railcar truck and the fourth railcar truck. The fourth railcar truck comprises an articulated railcar truck. The railcar further comprises a fourth well component supported by the fourth railcar truck and a fifth railcar truck. The fourth well component is disposed between the fourth railcar truck and the fifth railcar truck. The length of the fourth well component is restricted to transport an intermodal shipping container no longer than twenty feet in length.

In particular embodiments, the first and fifth railcar tracks comprise a 70-ton railcar truck, and the second, third, and fourth railcar trucks comprise a 125-ton railcar truck. The first and fourth well components are each configured to transport a double stack of twenty-foot intermodal shipping containers, and the second and third well components are each configured to transport a double stack of forty-foot intermodal shipping containers. A combined payload capacity of the first, second, third and fourth well components is at least 460,000 pounds.

According to some embodiments, an articulated railcar comprises a plurality of well components coupled together by articulated railcar trucks. Each well component is configured for transporting a double stack of intermodal shipping containers. The length of at least one well component of the plurality of well components is restricted to transport an intermodal shipping container no longer than twenty feet in length.

In particular embodiments, the length of at least two well components of the plurality of well components is restricted to transport an intermodal shipping container no longer than twenty feet in length. A combined payload capacity of the at least two well components may be at least 231,000 pounds.

In particular embodiments, the remaining well components of the plurality of well components are configured to transport an intermodal shipping container twenty feet in length or longer. A combined payload capacity of the plurality of well components may be at least 460,000 pounds. A payload per foot may be at least 2000 pounds.

As a result, particular embodiments of the present disclosure may provide numerous technical advantages. For example, one advantage is increased load efficiency based on the length of the articulated car when twenty-foot wells are used in conjunction with forty-foot wells. Twenty-foot wells may be integrated with currently used forty foot wells with minimal changes.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein:

FIG. 5 is a cross-sectional schematic of an example twenty-foot well, according to a particular embodiment;

FIG. 6 is block diagram side view of an example twenty-foot well car, according to some embodiments;

FIG. 7 is block diagram side view of an example of an articulated well car with two twenty-foot wells, according to some embodiments;

FIG. 8 is block diagram side view of an example forty-foot well car;

FIG. 9 is block diagram side view of an example of an articulated well car with two twenty-foot wells and one forty-foot well, according to some embodiments;

DETAILED DESCRIPTION

The modern double stack well car came into being in the 1970's and was originally configured for thirty-five foot and forty foot long by eight foot wide International Standards Organization (ISO) containers. The thirty-five foot ISO container was soon displaced by a twenty-foot ISO container. The allowed loaded weight for twenty toot and forty-foot ISO containers was 52,900 pounds and 67,200 pounds, respectively.

Generally, the containers were not loaded to their capacity, which enabled the railcars to be configured as a series of individual wells connected together over a single truck with an articulated connector, rather than each well having a truck on both ends. The containers were double stacked into the wells.

Over the years the loaded weight of the containers has increased to a point where the loaded twenty-foot container allowable weight is 67,200 pounds and the forty-foot containers to as much as 75,000 pounds. Even using a truck with the maximum available carrying capacity under the articulated wells, the truck cannot support four fully loaded containers.

Conventional articulated well cars (i.e., forty, forty-eight, and fifty-three foot well cars) cannot support four fully loaded ISO containers. As a result, the double stack feature of the wells cannot always be used. The limitation is particularly applicable to twenty-foot containers.

Particular embodiments obviate the problems described above and include an intermodal well car for twenty-foot ISO containers. According to some embodiments, a twenty-foot well that can be double stacked is more efficient in many cases, such as an articulated well car comprising all twenty-foot wells or a combination of forty-foot and twenty foot-wells. According to some embodiments, an articulated well car comprises at least one twenty-foot well.

As a result, particular embodiments of the present disclosure may provide numerous technical advantages. For example, one advantage is increased load efficiency based on the length of the articulated car when twenty-foot wells are used in conjunction with forty-foot wells. Twenty-foot wells may be integrated with currently used forty-foot wells with minimal changes.

Particular embodiments of the invention and its advantages are best understood by reference to FIGS. 1 through 12, wherein like reference numbers indicate like features.

Figure 1:
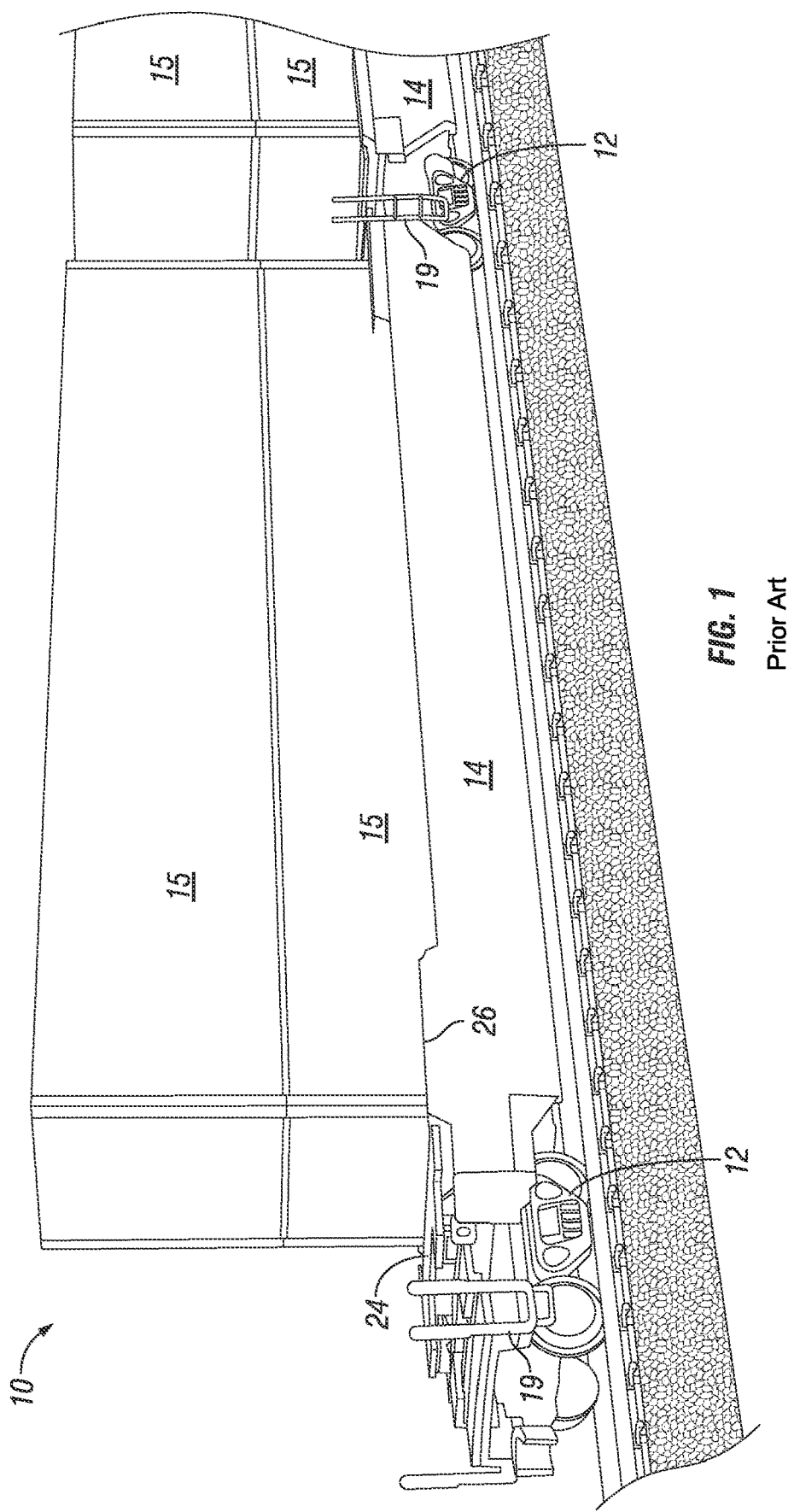
FIG. 1 is a perspective schematic of a prior art well car with intermodal containers.

FIG. 1 is a perspective schematic of an example well car with intermodal containers. Railcar 10 includes a pair of conventional trucks 12. Trucks 12 support well 14, which extends between trucks 12. Well 14 includes a recessed well for transporting containers 15, such as intermodal containers (e.g., 20 or 40-foot containers). Common conventional well lengths are forty, forty-eight, and fifty-three feet.

Well 14 transports the containers lower (i.e., closer to the rails) than a traditional flatcar. Thus, railcar 10 may transport containers 15 in a stacked configuration with one container 15 stacked on top of another container 15 (i.e., double-stack transport), as illustrated. Well 14 reduces the risk of the stacked containers encountering clearance problems. Well 14 also lowers the center of gravity of railcar 10 compared to a traditional flatcar. Well 14 may also be referred to as well component 14.

In some embodiments, railcar 10 comprises an articulated railcar. An articulated railcar comprises multiple wells 14 (e.g., two to five wells 14). Wells 14 may be connected via a single truck between wells 14.

Figure 2:
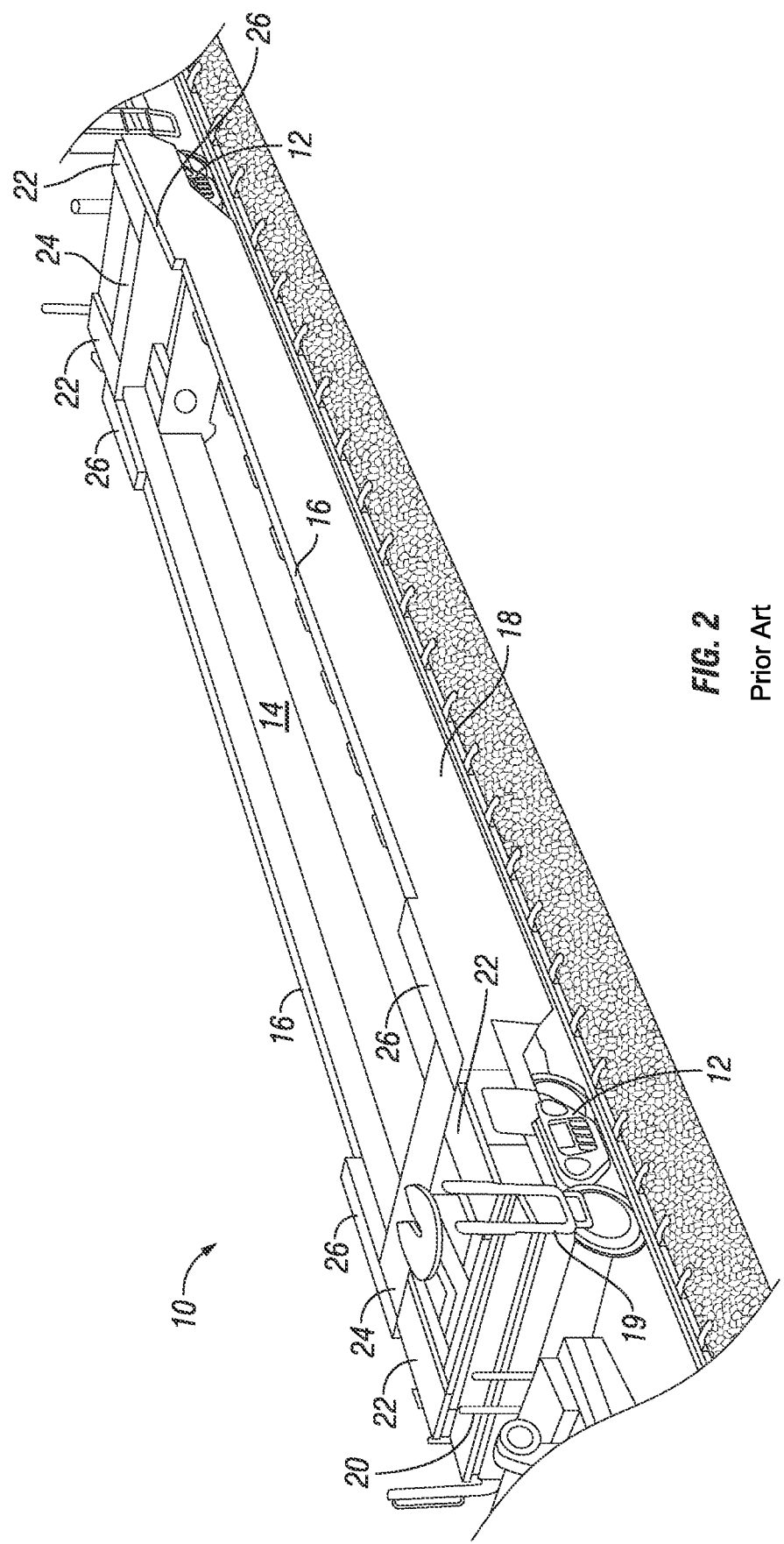
FIG. 2 is a perspective schematic of a prior art well car without intermodal containers.

FIG. 2 is a perspective schematic of an example well car without intermodal containers. Railcar 10 includes a pair of conventional trucks 12. Trucks 12 support well 14, which extends between trucks 12. Well 14 comprises top chords 16 and side sills 18. Top chords 16 typically comprise steel tube box sections and side sills 18 typically comprise angled steel sections. Well 14 is sized to accommodate standard sized intermodal shipping containers, such as a twenty-foot container.

As described above, conventional articulated well cars (i.e., forty, forty-eight, and fifty-three foot well cars) cannot support four fully loaded ISO containers. As a result, the double stack feature of the wells cannot always be used. The limitation is particularly applicable when transporting twenty-foot containers.

Particular embodiments include an intermodal well car for twenty-foot ISO containers. A twenty foot well that can be double stacked is more efficient in many cases, such as an articulated well car comprising all twenty-foot wells or a combination of forty-foot and twenty foot wells. Examples are illustrated in FIGS. 3-12.

Figure 3:
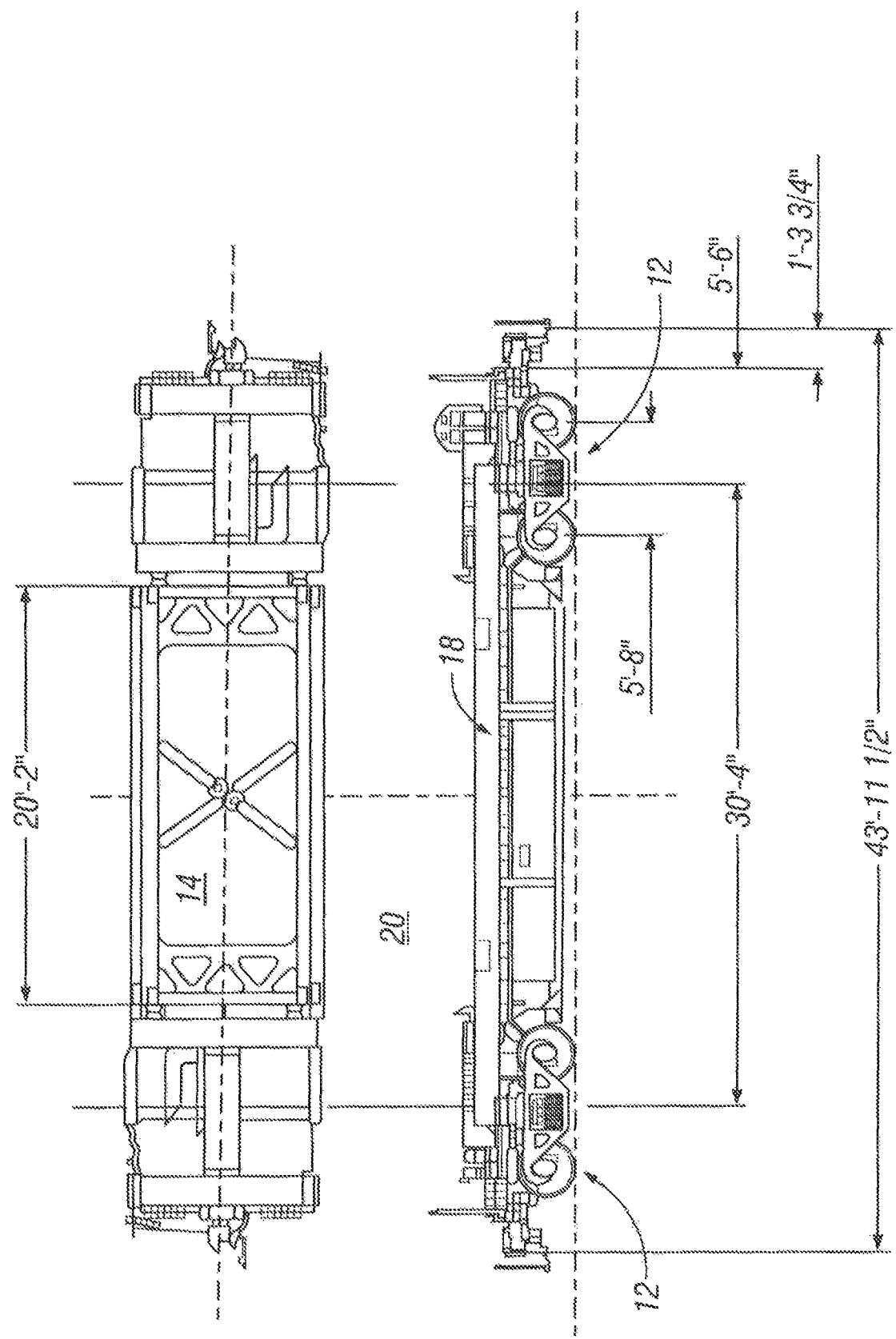
FIG. 3 is an overhead and side schematic of an example twenty foot well car, according to a particular embodiment.

FIG. 3 is an overhead and side schematic of an example twenty foot well car, according to a particular embodiment. Railcar 20 includes trucks 12, well 14, and side sills 18, similar to FIGS. 1 and 2. A difference is that well 14 is shorter in length than a conventional well car. Well 14 is long enough to accommodate a twenty-foot ISO container, but shorter than a well of a conventional well car. Minimizing the length of well 14 so that the length is just long enough to accommodate a twenty-foot ISO container minimizes the overall length of the well car. Although particular dimensions are illustrated in FIG. 3, the dimensions are only examples and other examples may include different dimensions.

Figure 4:
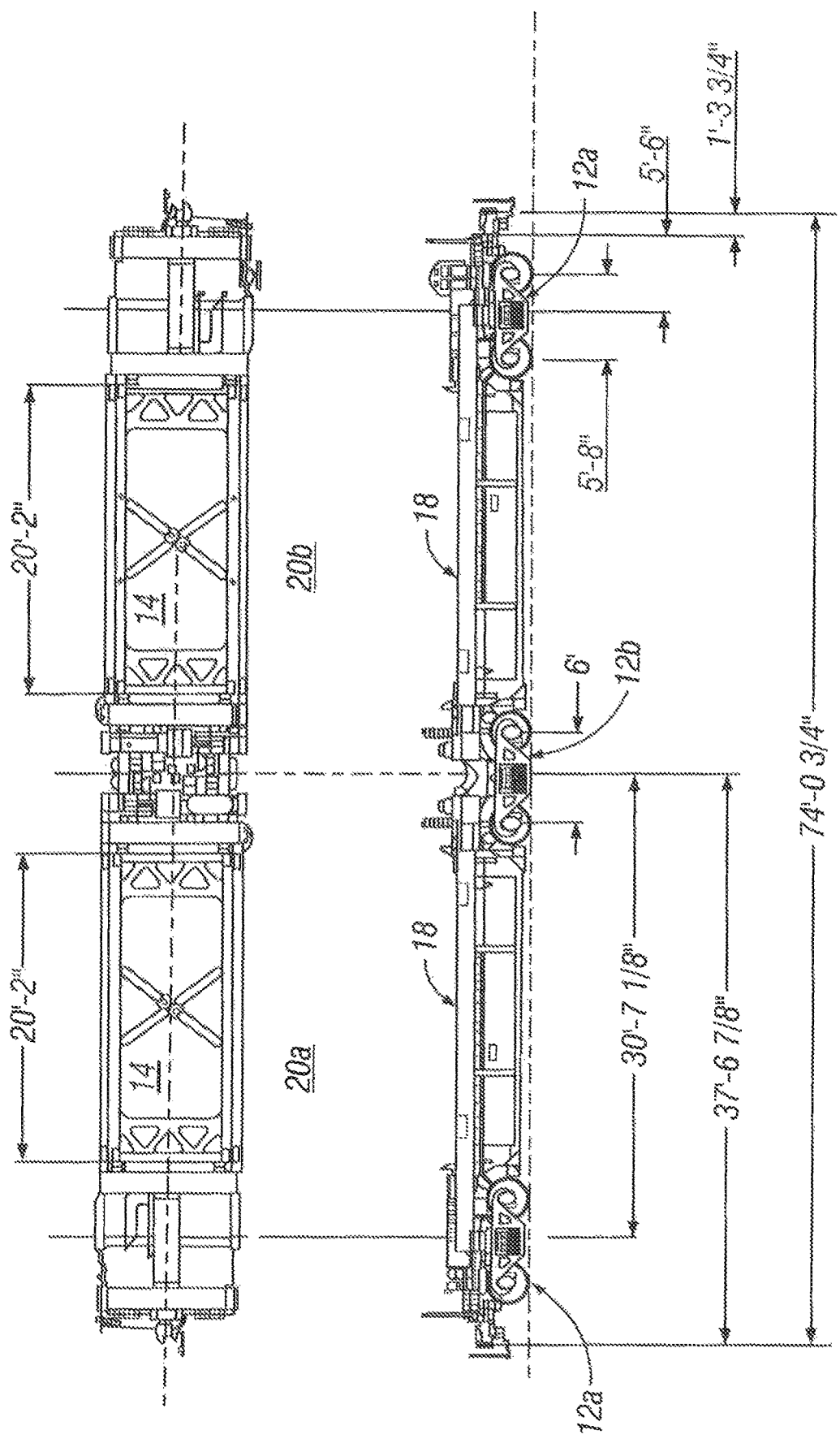
FIG. 4 is an overhead and side schematic of an example articulated twenty-foot well car, according to a particular embodiment.

FIG. 4 is an overhead and side schematic of an example articulated twenty-foot well car, according to a particular embodiment. The articulated well car includes two wells 14. Well car 20a shares truck 12b with well car 20b. Because truck 12b is shared between well car 20a and 20b, the gross rail load (GRL) for the articulated well car may be lower than the combined GRL for two standalone twenty-foot well cars.

In particular embodiments, trucks 12a and 12b may be rated for different capacities. For example, truck 12a may comprise a 70-ton capacity truck, and truck 12b may comprise a 125-ton capacity truck.

Although particular dimensions are illustrated in FIG. 4, the dimensions are only examples and other examples may include different dimensions.

FIG. 5 is a cross-sectional schematic of an example twenty foot well, according to a particular embodiment. Well 14 is similar in cross-section to well 14 described with respect to FIGS. 1-2. Although particular dimensions are illustrated in FIG. 5, the dimensions are only examples and other examples may include different dimensions.

FIG. 6 is block diagram side view of an example twenty foot well car, according to some embodiments. The simplified block diagrams are used as an aid for describing the payload capacity of a well. The payload capacity may depend on, for example, the construction of the wells and capacity rating of trucks 12. For example, trucks 12 may comprise 70-ton capacity trucks. The GRL for two 70-ton trucks is 220,000 pounds.

Containers 15a and 15b comprise twenty-foot ISO containers. Containers 15a and 15b may each be loaded to their maximum weight of 67,000 pounds. Both containers combined represent a weight of 134,000 pounds. The weight of a typical 20 foot well car without containers is approximately 50,000 pounds.

The combined weight of containers 15a, 15b, and the car structure is thus 184,000 pounds, which is less than the GRL of 220,000 pounds. Accordingly, a standalone twenty-foot well car can transport two (i.e., double-stack) fully loaded twenty-foot ISO containers.

In particular embodiments, trucks 12 may comprise a capacity higher or lower than 70 tons. In some embodiments, the weight of the empty well car may vary from the example described herein.

FIG. 7 is block diagram side view of an example of an articulated well car with two twenty-foot wells, according to some embodiments. Reference to a twenty-foot well herein refers to a well sized to contain a twenty-foot ISO container. The actual length of the well may vary.

Trucks 12a may comprise 70-ton trucks. Truck 12b may comprise a higher capacity truck, such as a 125-ton truck. One 125-ton truck supports a maximum GRL of 157,500 pounds (e.g., 315,000/2).

A typical weight of articulated well car 20 may be 42,000 pounds. The weight of well cars 20a and 20b combined is 84,000 pounds. Subtracting 84,000 pounds from the GRL of 315,000 pounds leaves a total payload capacity of 231,000 pounds. Dividing the total payload capacity of 231,000 pounds between well cars 20a and 20b results in an average payload capacity per well of 115,500 pounds. Dividing the average payload capacity per well between two containers (i.e., containers 15a and 15b, or 15c and 15d) results in an average payload capacity per container 15 of 57,750 pounds. While 57,750 pounds is less than the maximum load per container 15 of 67,000 pounds, the carrying capacity of the articulated twenty-foot well car is more efficient per length than a standalone forty-foot well car. An example is illustrated in FIG. 8.

FIG. 8 is block diagram side view of an example forty-foot well car. Reference to a forty-foot well herein refers to a well sized to contain a forty-foot (or smaller) ISO container. The actual length of the well may vary.

As an example, trucks 12 may comprise 70-ton capacity trucks. The GRL for two 70-ton trucks is 220,000 pounds. Standalone forty-foot well car 40 may transport a combination of twenty and forty-foot ISO containers. In the illustrated example, standalone forty-foot well car 40 is loaded with two twenty-foot ISO containers 15a and 15b on bottom and one forty-foot ISO container 15c on top.

The weight of a typical forty-foot well car is approximately 65,000 pounds. Subtracting the 65,000 pound weight of well car 40 from the GRL of 220,000 pounds results in a payload capacity of 155,000 pounds. Thus, for approximately the same length of rail car (i.e., two twenty foot wells compared to one forty-foot well), the articulated twenty-foot well car of FIG. 7 has a larger payload capacity (i.e., 231,000 pounds) than the standalone forty-foot well car of FIG. 8 (i.e., 155,000 pounds).

FIG. 9 is block diagram side view of an example articulated well car with two twenty-foot wells and one forty-foot well, according to some embodiments. The articulated well car includes three wells and four trucks 12. In some embodiments, each well car 20 is 27.5 feet long and well car 40 is 55 feet long. Other embodiments may include different length cars.

If the average payload capacity per well is 115,000 pounds, then the total combined payload capacity of all three wells is 345,000 pounds. If the combined length of the three well cars is 110 feet, then the payload per foot is 3,136 pounds. The payload per foot may be compared to an articulated well car with two forty-foot wells, as illustrated in FIG. 10.

Figure 10:
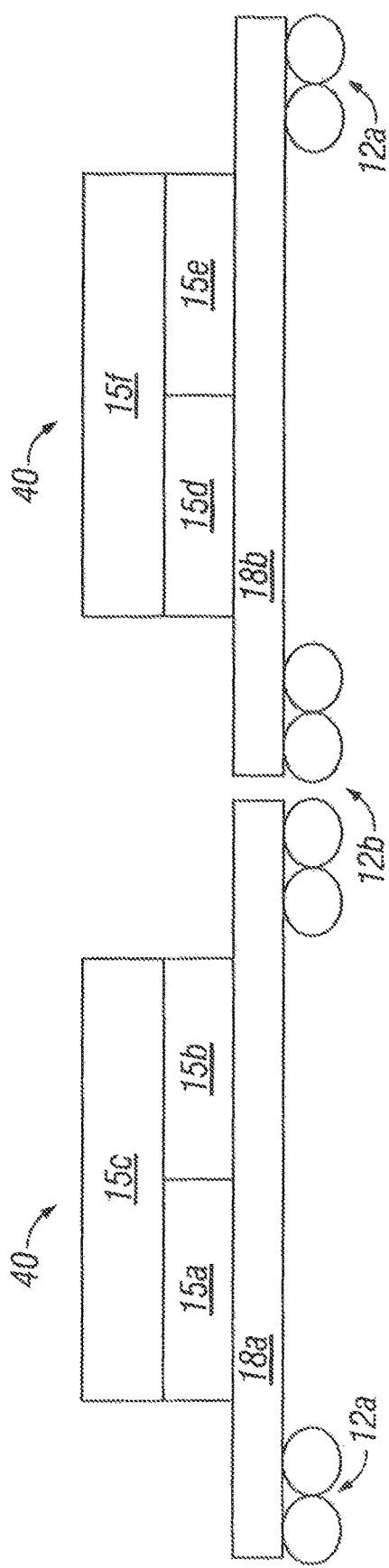
FIG. 10 is block diagram side view of an example articulated well car with two forty-foot wells.

FIG. 10 is block diagram side view of an example articulated well car with two forty-foot wells. The articulated well car includes two wells and three trucks 12. In some embodiments, each well car 40 is 47.5 feet long. Other embodiments may include different length cars.

If the average payload capacity per well is 115,000 pounds, then the total combined payload capacity of both wells is 230,000 pounds. If the combined length of both well cars is 95 feet, then the payload per foot is 2,421 pounds. Thus, the configuration illustrated in FIG. 9 has a 22 percent higher payload per foot capacity than the configuration illustrated in FIG. 10. Another example is illustrated in FIGS. 11 and 12.

Figure 11:
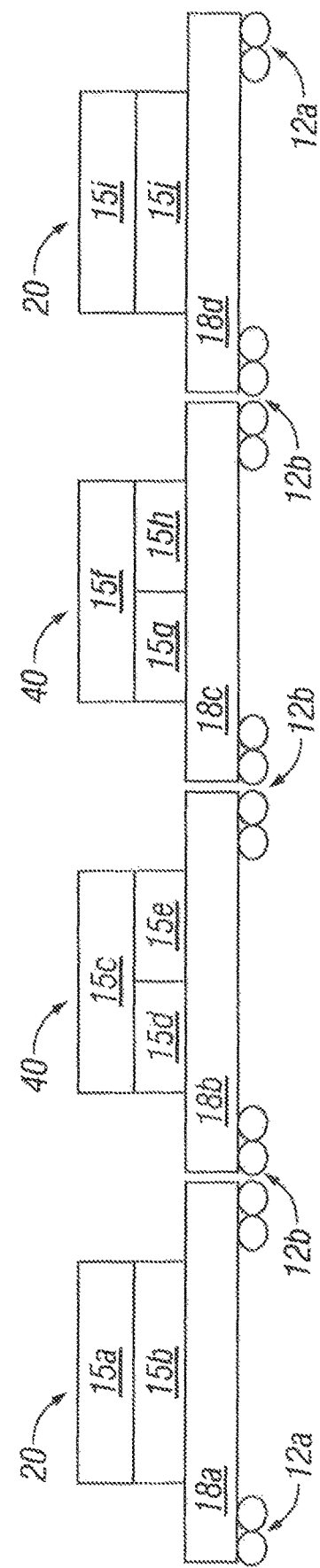
FIG. 11 is block diagram side view of an example articulated well car with two twenty-foot wells and two forty-foot wells, according to some embodiments.

FIG. 11 is block diagram side view of an example of an articulated well car with two twenty-foot wells and two forty-foot wells, according to some embodiments. The articulated well car includes four wells and five trucks 12. In some embodiments, each well car 20 is 27.5 feet long and each well car 40 is 55 feet long. Other embodiments may include different length cars.

If the average payload capacity per well is 115,000 pounds, then the total combined payload capacity of all four wells is 460,000 pounds. If the combined length of the four well cars is 165 feet, then the payload per foot is 2,788 pounds. The payload per foot may be compared to an articulated well car with three forty-foot wells, as illustrated in FIG. 12.

Figure 12:
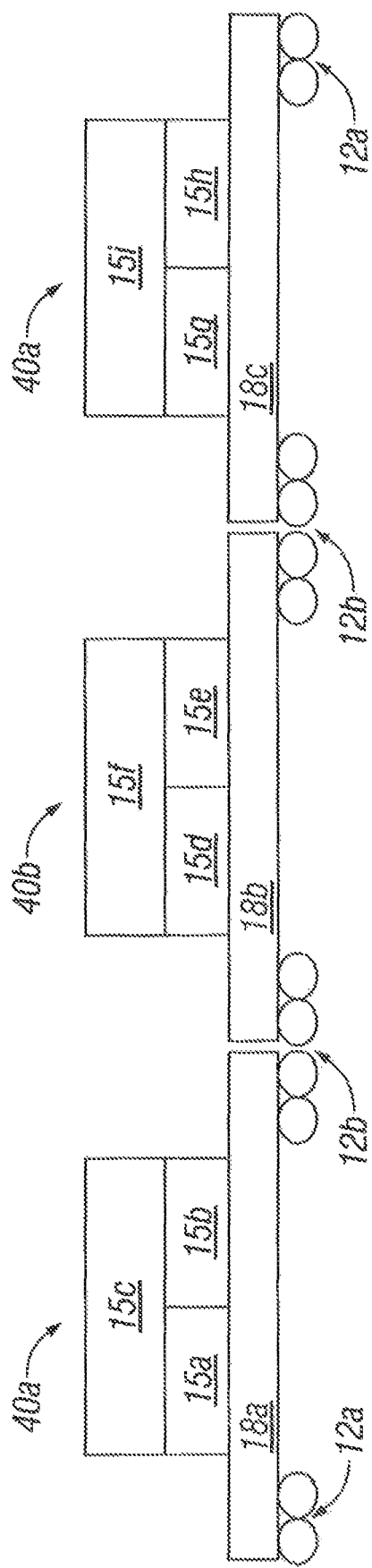
FIG. 12 is block diagram side view of an example articulated well car with three forty-foot wells.

FIG. 12 is block diagram side view of an example of an articulated well car with three forty-foot wells. The articulated well car includes three wells and four trucks 12. In some embodiments, each well car 40a is 57.5 feet long and well car 40b is 55 feet long. Other embodiments may include different length cars.

If the average payload capacity per well is 115,000 pounds, then the total combined payload capacity of all three wells is 345,000 pounds. If the combined length of all three well cars is 170 feet, then the payload per foot is 2029 pounds. Thus, the configuration illustrated in FIG. 11 has a 27.2 percent higher payload per foot capacity than the configuration illustrated in FIG. 12.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Although embodiments of the present disclosure and their advantages have been described in detail, it should be understood that various changes, substitutions and alternations can be made herein without departing from the spirit and scope of the invention.

The invention claimed is:

1. A railcar comprising:
   a first well component supported by a first railcar truck and a second railcar truck, the first well component disposed between the first railcar truck and the second railcar truck; and
   wherein the length of the first well component is restricted to transport an intermodal shipping container no longer than twenty feet in length.

2. The railcar of claim 1, wherein the length of the first well component is longer than twenty feet and less than forty feet.

3. The railcar of claim 1, wherein the length of the first well component is longer than twenty feet and less than twenty-one feet.

4. The railcar of claim 1, wherein the first well component is configured to transport a double stack of twenty-foot intermodal shipping containers.

5. The railcar of claim 4, wherein each twenty-foot shipping container of the double stack is loaded to its maximum weight of 67,000 pounds.

6. The railcar of claim 1, wherein the first railcar truck comprises a 70-ton railcar truck and the second railcar truck comprises a 70-ton railcar truck.

7. The railcar of claim 1, wherein the second railcar truck is an articulated railcar truck and the railcar further comprises a second well component supported by the second railcar truck and a third railcar truck, the second well component disposed between the second railcar truck and the third railcar truck; and
   wherein the length of the second well component is restricted to transport an intermodal shipping container no longer than twenty feet in length.

8. The railcar of claim 7, wherein the first railcar truck comprises a 70-ton railcar truck, the second railcar truck comprises a 125-ton railcar truck, and the third railcar truck comprises a 70-ton railcar truck.

9. The railcar of claim 7, wherein the first well component is configured to transport a double stack of twenty-foot intermodal shipping containers, and the second well component is configured to transport a double stack of twenty-foot intermodal shipping containers.

10. The railcar of claim 9, wherein a combined payload capacity of the first well component and the second well component is at least 231,000 pounds.

11. The railcar of claim 1, wherein the second railcar truck is an articulated railcar truck and the railcar further comprises:
   a second well component supported by the second railcar truck and a third railcar truck, the second well component disposed between the second railcar truck and the third railcar truck, the third railcar truck comprising an articulated railcar truck;
   a third well component supported by the third railcar truck and a fourth railcar truck, the third well component disposed between the third railcar truck and the fourth railcar truck, the fourth railcar truck comprising an articulated railcar truck;
   a fourth well component supported by the fourth railcar truck and a fifth railcar truck, the fourth well component disposed between the fourth railcar truck and the fifth railcar truck; and
   wherein the length of the fourth well component is restricted to transport an intermodal shipping container no longer than twenty feet in length.

12. The railcar of claim 11, wherein the first railcar truck comprises a 70-ton railcar truck, the second railcar truck comprises a 125-ton railcar truck, the third railcar truck comprises a 125-ton railcar truck, the fourth railcar truck comprises a 125-ton railcar truck, and the fifth railcar truck comprises a 70-ton railcar truck.

13. The railcar of claim 11, wherein the first well component is configured to transport a double stack of twenty-foot intermodal shipping containers, the second well component is configured to transport, a double stack of forty-foot intermodal shipping containers, the third well component is configured to transport a double stack of forty-foot intermodal shipping containers, and the fourth well component is configured to transport a double stack of twenty-foot intermodal shipping containers.

14. The railcar of claim 13, wherein a combined payload capacity of the first well component, the second well component, the third well component, and the fourth well component is at least 460,000 pounds.

15. An articulated railcar comprising:
   a plurality of well components coupled together by articulated railcar trucks, each well component configured for transporting a double stack of intermodal shipping containers; and
   wherein the length of at least one well component of the plurality of well components is restricted to transport an intermodal shipping container no longer than twenty feet in length.

16. The articulated railcar of claim 15, wherein the length of at least two well components of the plurality of well components is restricted to transport an intermodal shipping container no longer than twenty feet in length.

17. The railcar of claim 16, wherein a combined payload capacity of the at least two well components is at least 231,000 pounds.

18. The articulated railcar of claim 15, wherein the remaining well components of the plurality of well components are configured to transport an intermodal shipping container twenty feet in length or longer.

19. The articulated railcar of claim 15, wherein a combined payload capacity of the plurality of well components is at least 460,000 pounds.

20. The articulated railcar of claim 15, wherein a payload per foot is at least 2000 pounds.

* * * * *